United States Patent Office 3,127,397
Patented Mar. 31, 1964

3,127,397
3-ETHYLENEDIOXY-17β-BENZYL-OXYSTEROIDS
Eugene L. Woroch, Itasca, Ill., assignor to Abbott Laboratories, North Chicago, Ill., a corporation of Illinois
No Drawing. Filed Sept. 10, 1962, Ser. No. 222,633
3 Claims. (Cl. 260—239.55)

The present invention is concerned with steroid ethers; more particularly, it is concerned with the 17-benzyl ethers of steroids of the androstane and estrane series carrying in the 3-position a keto group or an ethylenedioxy group.

The new steroids can be expressed by the formula

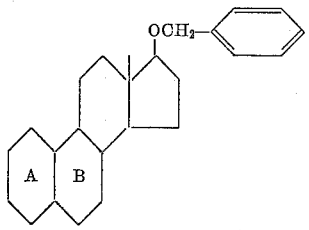

wherein the A/B rings have a configuration selected from

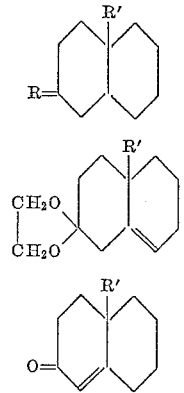

and

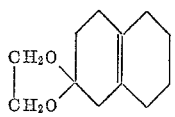

wherein R is oxygen or ethylenedioxy and wherein R' is hydrogen or methyl.

The new compounds of the present invention are useful as hormonal agents; they have androgenic activity.

The new 17-steroid ethers are prepared by a very simple process consisting essentially in refluxing a saturated or 5-unsaturated 3-ethylenedioxy-17-hydroxysteroid with an alkali metal in a water-immiscible, inert solvent, converting the formed alkali metal salt to the corresponding benzyl ether by treating it with benzyl halide and, if desired, hydrolyzing the ketal group in the 3-position to the carbonyl group. In the case of a Δ⁵-3-ethylenedioxysteroid, the initial double bond in the 5-position remains at 5-6 while, after hydrolysis of the ethylenedioxy group to the corresponding keto group, the double bond shifts to the 4-5 position.

The present invention is more clearly described by reference to the following examples which are given here as illustrations only and are not meant to limit the invention in any respect.

EXAMPLE 1

3-Ethylenedioxy-17β-Benzyloxyandrost-5-Ene

A three-necked flask is charged with 3.0 grams of 3-ethylenedioxyandrost-5-en-17β-ol, 300 ml. of dry, thiophene-free benzene, and 2.4 grams of potassium metal. The mixture is refluxed and stirred vigorously for 3 hours. The resulting suspension is treated with 12 ml. of benzyl bromide and stirred under reflux for 17 hours. The excess potassium is decomposed by the addition of 25 ml. of tertiary butyl alcohol. The solution is then poured into water and the organic layer is separated and washed with water. A few drops of pyridine are added to the washed, organic phase which is then evaporated to dryness under vacuum. The sticky solid obtained is purified by dissolving it in ethanol, slowly evaporating the solvent and replacing the evaporating ethanol with benzene. Upon cooling, 2.88 grams of 3-ethylenedioxy-17β-benzoyloxy-androst-5-ene melting at 197–200° C. is obtained. An analytical sample obtained by recrystallization from benzene/petroleum ether is obtained in prisms melting at 207–208° C. in an evacuated melting-point tube; it analyzes 79.71% C and 9.0% H, which is in agreement with the calculated values for $C_{28}H_{38}O_3$.

EXAMPLE 2

17β-Benzyloxyandrost-4-En-3-One

A suspension of 1.25 grams of 3-ethylenedioxy-17β-benzyloxyandrost-5-ene in 125 ml. of methanol, 20 ml. of benzene, and 5 ml. of 10% aqueous hydrochloric acid is warmed until a clear solution is formed. After standing overnight at room temperature, the solution is concentrated in vacuo and the residue is diluted with water. The crystals thus obtained are filtered, washed with water, and dried, yielding 1.07 grams of 17β-benzyloxyandrost-4-en-3-one, melting at 121–126° C. An analytical sample obtained as prisms from ether/petroleum ether by the above-described solvent-evaporation/replacement method, melts at 126–128.5° C. and analyzes 82.39% C and 8.94% H which is in agreement with the calculated values for $C_{26}H_{34}O_2$.

EXAMLE 3

3-Ethylenedioxy-17β-Benzyloxyestrene

By replacing the 3-ethylenedioxyandrost-5-en-17β-ol of Example 1 with 3-ethlylenedioxyestren-17β-ol which contains a double-bond connecting to the 5-position, and otherwise proceeding exactly as described in Example 1, a mixture of Δ⁵⁽⁶⁾- and Δ⁵⁽¹⁰⁾-ethylenedioxy-17β-benzyloxy-estrene is obtained, having an empirical formula of $C_{27}H_{36}O_3$. The 3-ethylenedioxy-17β-benzyloxyestr-5(6)-ene is separated from 3-ethylenedioxy-17β-benzyloxyestr-5(10)-ene by known chromatographic methods.

EXAMPLE 4

17β-Benzyloxyestr-4-En-3-One

By following the procedure described in Example 2 but replacing 3-ethylenedioxy-17β-benzyloxyandrost-5-ene with either one of the 3-ethylenedioxy-17β-benzyloxy-estrenes of Example 3 or their mixture, 17β-benzyloxy-estr-4-en-3-one is obtained, having an empirical formula of $C_{25}H_{32}O_2$.

In analogy with the above examples, the corresponding saturated compounds can also be prepared in the same manner, starting with 3-ethylenedioxyandrostan-17β-ol or 3-ethylenedioxyestran-17β-ol, respectively. The compounds obtained thereby are 3-ethylenedioxy-17β-benzyl-oxyandrostane ($C_{28}H_{40}O_3$) which hydrolyzes to 17β-benzyloxyandrostan-3-one ($C_{26}H_{36}O_2$), and 3-ethylene-dioxy-17β-benzyloxyestrane ($C_{27}H_{38}O_3$) which hydrolyzes to 17β-benzyloxyestran-3-one ($C_{25}H_{34}O_2$).

In the process of preparing the new steroid ethers, the corresponding 17-hydroxysteroid is first converted to the alkali metal salt, preferably the lithium, potassium or sodium salt. This reaction is carried out at a temperature between 40° and 120° C. in the presence of an inert, water-immiscible solvent. The term "inert" is meant to express that the solvent does not enter any reaction with either component of the reaction mixture, with the resulting steroid ether to be formed, or with the benzyl halide with which this salt is to be reacted. Among these solvents are benzene, toluene, xylenes, petroleum ether, and other high-boiling hydrocarbons, etc.

The benzyl halide used in the present process is chosen from benzyl chloride or benzyl bromide. The reaction with this benzyl halide is preferably carried out at a temperature between 40° and 120° C. for a period exceeding 3 hours. It is to be noted that any excess alkali metal which may still be in suspension at this point of the reaction can be destroyed after the steroid ether is formed by adding to the reaction mixture an alcohol, e.g., tertiary butyl alcohol or similar low-boiling alcohols. Since the initial reaction mixture is in a water-immiscible solvent, pouring the formed mixture containing the benzyl ether into water produces two layers. The steroid benzyl ether can be isolated from the organic layer by evaporation of the solvent or by adding a second liquid, miscible, organic medium in which the ether is insoluble.

Others may practice the invention in any of the numerous ways which will be apparent to one skilled in the art by the present disclosure. All such practice of the invention shall be considered a part hereof provided it falls within the scope of the appended claims.

I claim:
1. 17β-benzyloxy-3-ethylenedioxyandrost-5-ene.
2. 17β-benzyloxy-3-ethylenedioxyestr-5(10)-ene.
3. 17β-benzyloxy-3-ethylenedioxyestr-5(6)-ene.

References Cited in the file of this patent

UNITED STATES PATENTS

| | | |
|---|---|---|
| 2,705,237 | Djerassi et al. | Mar. 29, 1955 |
| 2,739,974 | Colton | Mar. 27, 1956 |

OTHER REFERENCES

Brewster: "Organic Chemistry," Prentice Hall, Inc., 70 Fifth Ave., New York, 1948, pp. 588–593.

Migrdichian: "Organic Synthesis," 1957, vol. 2, Reinhold Publishing Corp., New York, pp. 1283–1284.